March 24, 1936.  S. B. COLEMAN  2,035,262
SAW
Filed Feb. 5, 1934
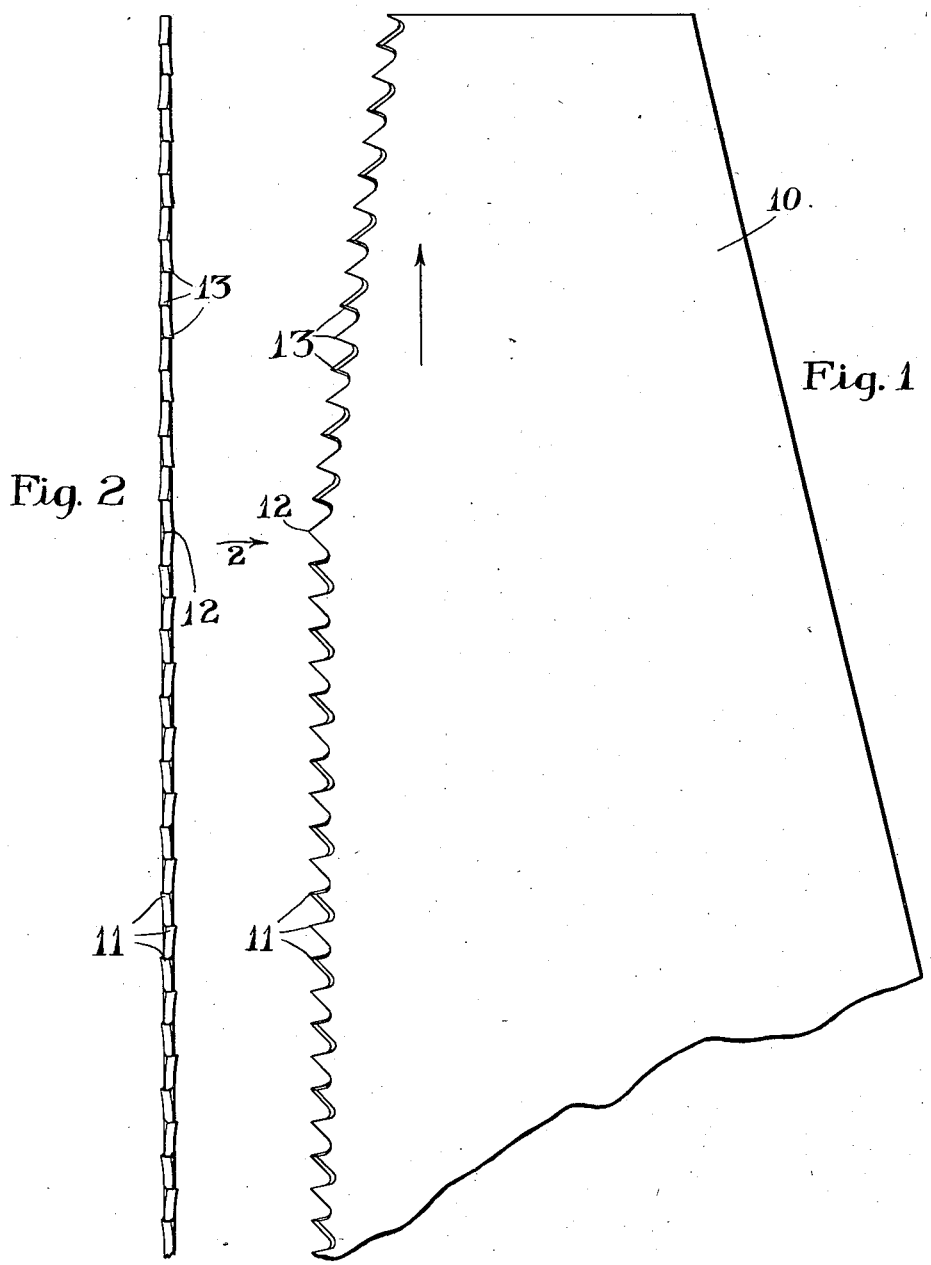
WITNESSES:
INVENTOR:
Stanton B. Coleman
BY
ATTORNEY Patented Mar. 24, 1936

2,035,262

UNITED STATES PATENT OFFICE 2,035,262

SAW

Stanton B. Coleman, Rutledge, Pa.

Application February 5, 1934, Serial No. 709,739

1 Claim. (Cl. 143—133)

This invention relates to saws and has for an object to utilize a heretofore unutilized saw section.

It is well known that in the ordinary use of a hand saw, several inches at the tip of the saw are practically unused except as a guide to retain the saw in the kerf, and prevent to a certain extent the buckling of the saw.

The present invention takes advantage of those few inches at the tip of the saw to provide means for performing a function which cannot be performed by the ordinary saw.

An object of the invention is, therefore, to so shape the tip of the saw that while not detracting from its utility for guiding purposes, provides it with teeth so arranged as to efficiently operate on the pull stroke of the saw.

A further object of the invention is to taper the cutting edge of the saw for an indeterminate distance from the tip end thereof, and to provide such tapered section with teeth inclined toward the handle and adapted, therefore, to cut on the pull stroke of the saw.

The invention, therefore, comprises the use of the saw with the usual or conventional teeth of any type arranged along the usual straight line, as approved in saw construction, but with a section at the tip end of the saw depending from such straight line at a taper, the taper part being provided with teeth, the cutting edges of which are inclined toward the handle and adapted to cut as the saw is pulled by the user.

The drawing illustrates an embodiment of the invention and the views therein are as follows:

Figure 1 is a view in side elevation of a saw embodying the present invention and on normally greatly exaggerated scale, and Figure 2 is a view of the saw in edge elevation, as indicated by arrow 2 at Figure 1.

Like characters of reference indicate corresponding parts throughout the several views.

The saw 10 is intended to represent an ordinary hand saw and the shape, proportion, or contour, as indicated in the drawing, is wholly conventional and may be varied in accordance with the customs now or hereafter approved in saw construction.

The saw is provided with the usual cutting-off teeth 11. These teeth, as shown in the drawing, are slightly inclined toward the tip of the saw, which is an approved type of tooth, but it is to be understood that the invention is in no way limited to the teeth appearing on this section of the saw.

These teeth 11 are, in the usual construction and upkeep of a saw, arranged with their points in a true straight line. As shown, this straight line will continue to the point 12. The point at which the line of teeth diverge from this straight line, indicated at 12, may be moved in either direction so that the diverging line may be greater or less in proportion to the remaining parts of the saw and the invention includes within its scope divergence of any proportion.

On this diverging line the teeth 13 are provided with their cutting edges inclined away from the tip of the saw, and, therefore, toward the handle. The teeth 13 are so arranged as to slide without cutting to any efficient degree when moving in the direction indicated by the arrow, but when moving in the direction opposite to the arrow, these teeth will cut, and it is, therefore, apparent that they will cut only on a pull stroke.

A saw arranged in accordance with the present invention is of general utility as a cutting-off saw but the diverging section, while still operating as a guide for the proper functioning of the saw, also permits the use of that section for various purposes to which a saw having straight line teeth only cannot be put.

As an example only, in initiating the cut in a floor board, the handle and the sections of saw represented by the teeth 11 may be held at an angle relative to the plane of the floor, and the section represented by the teeth 13, by reason of the draw cut, will quickly cut into the flat surface of the floor and sever a floor board so that the saw may be used extending through the kerf provided by such initial cut.

This is only a single example of the utility of a saw made in accordance with the present invention, and other uses and utilities will readily present themselves to one skilled in the art of using saws.

I claim:—

A saw having a conventional straight line cutting area, and a straight line section at the tip diverging from the line of the cutting area and forming an angle therewith by which the width of the saw is reduced to its narrowest dimension at the free end of the saw and provided with teeth inclined away from said tip.

STANTON B. COLEMAN.